United States Patent
McIntosh et al.

(10) Patent No.: US 8,086,871 B2
(45) Date of Patent: Dec. 27, 2011

(54) METHOD FOR FAST DECRYPTION OF PROCESSOR INSTRUCTIONS IN AN ENCRYPTED INSTRUCTION POWER ARCHITECTURE

(75) Inventors: Gordon D. McIntosh, Austin, TX (US); Edward John Silha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1980 days.

(21) Appl. No.: 11/114,552

(22) Filed: Apr. 26, 2005

(65) Prior Publication Data
US 2006/0242702 A1    Oct. 26, 2006

(51) Int. Cl.
*G06F 11/30* (2006.01)

(52) U.S. Cl. ........ 713/190; 713/189; 711/163; 711/164; 726/1; 726/2; 726/22; 726/26; 726/34; 712/208; 712/209

(58) Field of Classification Search .............. 713/189, 713/190; 711/163, 164; 726/1, 2, 22, 26, 726/34; 712/208, 209
See application file for complete search history.

(56) References Cited

U.S. PATENT DOCUMENTS

| | | | |
|---|---|---|---|
| 2002/0051536 A1* | 5/2002 | Shirakawa et al. | 380/45 |
| 2002/0101995 A1 | 8/2002 | Hashimoto et al. | 380/277 |
| 2002/0129244 A1* | 9/2002 | DaCosta | 713/165 |
| 2002/0194389 A1* | 12/2002 | Worley, Jr. et al. | 709/310 |
| 2003/0046563 A1 | 3/2003 | Ma et al. | 713/190 |
| 2004/0117639 A1 | 6/2004 | Mowery | 713/187 |
| 2004/0240484 A1* | 12/2004 | Argyres et al. | 370/535 |
| 2004/0255199 A1 | 12/2004 | Yamashita | 714/37 |
| 2005/0188171 A1* | 8/2005 | McIntosh | 711/200 |
| 2006/0015748 A1* | 1/2006 | Goto et al. | 713/190 |

FOREIGN PATENT DOCUMENTS

| | | |
|---|---|---|
| JP | 2001034474 A | 2/2001 |
| JP | 2005018434 A | 1/2005 |

OTHER PUBLICATIONS

Japan Office Action partial translation Jul. 5, 2011.

* cited by examiner

*Primary Examiner* — Edan Orgad
*Assistant Examiner* — Roderick Tolentino
(74) *Attorney, Agent, or Firm* — Mitch Harris, Atty at Law, LLC; Andrew M. Harris; Matthew W. Baca

(57) ABSTRACT

A method and apparatus for an independent operating system that prevents certain classes of computer attacks. Instruction decryption is performed on an existing instruction set for a processor. The processor architecture limits the impact on processor execution timing. The instruction execution timing is not altered in the processor core and any additional processing is overlapped into existing operations.

21 Claims, 4 Drawing Sheets

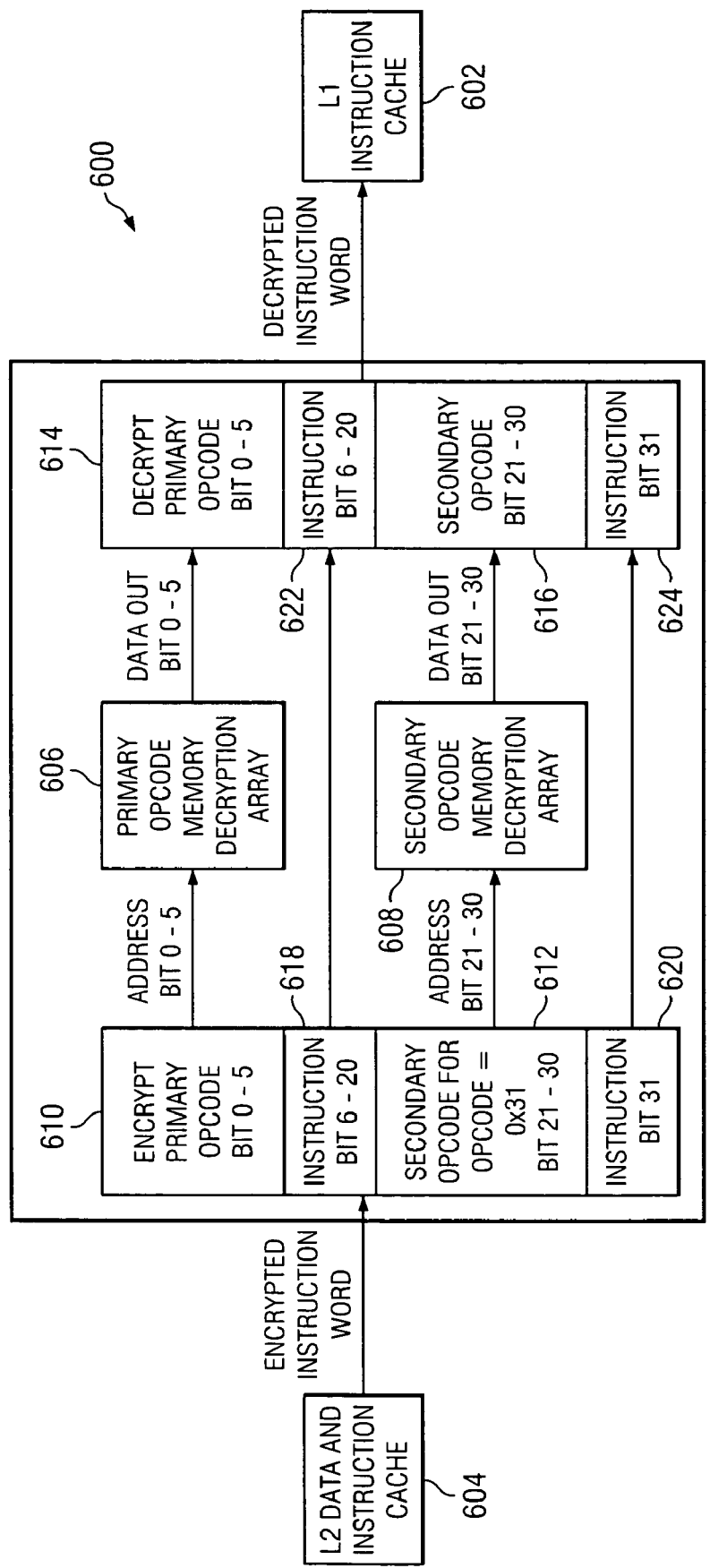

METHOD FOR FAST DECRYPTION OF PROCESSOR INSTRUCTIONS IN AN ENCRYPTED INSTRUCTION POWER ARCHITECTURE

BACKGROUND OF THE INVENTION

1. Technical Field

The present invention relates generally to an improved data processing system and in particular to a method and apparatus for decrypting processor instructions. Still more particularly, the present invention provides fast decryption of processor instructions in an encrypted instruction Power™ architecture.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

With this increased connectivity through the Internet, computer systems are experiencing an increasing number of attacks by individuals using increasingly sophisticated methods of attack. As the number of systems connected to insecure networks, both intranet and Internet, the potential for damage increases. The increasing dependence on a single operating system (Microsoft Windows), and a single processor architecture (Intel) for the vast majority of systems has exacerbated this problem and made worldwide attacks possible to infect very large numbers of computer systems.

The currently available solutions include, for example, virus detection software, firewalls, government initiatives, security policies, and evaluation systems. Virus detection software are programs or code that scan data input through network connections and file systems for some 64000+ known viruses, as well as, applying rules based tools to scan for "virus like" programs. Firewalls are used to block network access from sources not specifically allowed.

Extensive initiatives from US Government agencies, such as NSA, NIAP, NIST, and FIPS, are being implemented. NSTISSP No. 11 is a security policy governing acquisition of IT products by the US Government. Further, International community support is present for the Common Criteria (CC) Evaluation of IT systems.

Starting in the early 1980s the US government established initiatives targeted at increasing the security level of computer systems. Early efforts most widely known as the "Orange Book" started with the NSA's "Rainbow Series" were evaluated by other governments and an initiative known as the Common Criteria emerged to develop a set of "common" security standards that would be recognized by governments of member nations. This effort is currently receiving rapidly increasing support from the predominately Western member nations and membership has increased from 7 nations to 13 nations with additional interest being shown by Japan, China, Korea and other Asian nations.

The standard known as the Common Criteria v1.0 was initially released in 1996, is currently at v2.2 (2004), and has widespread acceptance, as well as, ISO recognition (ISO/IEC 15408, 1999). This standard provides comprehensive discussions of security using a hierarchical framework of security concepts and terminology with viewpoints from consumers, developers, and evaluators/certifiers. The standard outlines extensive security methodology that starts in design and follows through to deployment. This standard is a rapidly evolving standard, reacting to the changing demands of international security.

The most influential event in the acceptance of security standards was Directive NSTISSP no. 11 from the chairman of the NSTISSP. In February 2000, it was directed that all IT systems acquired after 1 Jul. 2002 that need information Assurance (IA) be certified by the Common Criteria or the FIPS Cryptomodule Validation Program. This has resulted in many companies selling IT equipment to the US government to start certification programs. Additionally Presidential Decision Directive on Critical Infrastructure Protection (PDD-63) encourages CC certification for the operation of any IT system associated with the operation of critical infrastructures.

These current solutions all have drawbacks. For example, virus detection programs are effective only against known viruses. New viruses are largely undetected as the rules based techniques are almost completely ineffective. The detection of a virus is therefore done after the fact. In this situation, the attack is already underway, prior to the detection and usually has done damage already.

The companies selling virus protection are required to detect a new virus or variant of an old virus, assess the damage potential, develop compatible detection algorithms, notify users, and make updates to the virus protection. This procedure is a time consuming process and can take from a few hours to a week to accomplish.

Users of the virus protection must connect to the Internet to download the new virus protection thereby exposing their computer to attack. The protection must be downloaded, the virus protection program updated, and the system scanned for viruses. The process of scanning the computer can take as much as several hours, further limiting productivity of the work force. Even users of computers not infected can have appreciable loss of use to their computer system. Users of infected systems can suffer loss from a few hours to a few weeks.

Firewalls contain a weakness because they depend on blocking network traffic using IP addresses to perform selection of trusted sources. Attacks delivered through trusted sources such as email and files downloaded via browsers are not affected by firewall protection. Firewalls are also ineffective in preventing attackers scanning for vulnerability such as network ports left open by poor programming practices.

With respect to initiatives, acquisition policies and Common Criteria, these programs contain vulnerabilities. For example, although the widespread acceptance of the Common Criteria was greatly encouraged by NSTISSP no. 11, the cost of the process is very substantial and time consuming. The standard is still evolving and specialized expertise is required to accomplish certification. The results are still relatively unproven and recent attack successes have shown weaknesses in the model, especially the vulnerability analysis. The process of obtaining certification may last from 6 months for low assurance levels to more than 3 years for high assurance levels.

It is well recognized that vulnerability analysis of computer systems striving to prevent attacks can only give a level of assurance that attacks will not succeed. This analysis depends heavily on the concepts of attack potential vs. the strength of security function that has been designed into the system. These measures are passive methods that are in their infancy of definition and are subjective at best, resulting in a security methodology that has been ineffective as recent successful worldwide attacks have proven.

Therefore, any solution to improving the prevention of vulnerability to virus and worm attacks would require an independent operating system method, apparatus and computer instructions for the prevention of certain classes of computer attacks that have previously not been preventable.

SUMMARY OF THE INVENTION

The present invention provides a method and apparatus for an independent operating system for the prevention of certain classes of computer attacks that have previously not been preventable. The exemplary aspects of the present invention details an effective methodology to implement instruction decryption using the existing instruction set for a processor. Significant hurdles are addressed in the processor architecture so as to limit the impact to processor execution timing. The present implementation does not alter instruction execution timing in the processor core. Any additional processing is overlapped into existing operations and, therefore, the impact on processor throughput is minimal.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram illustrating a primary and a secondary opcode decryption unit in accordance with a preferred embodiment of the present invention.

DETAILED DESCRIPTION OF THE PREFERRED EMBODIMENT

Figure 1:
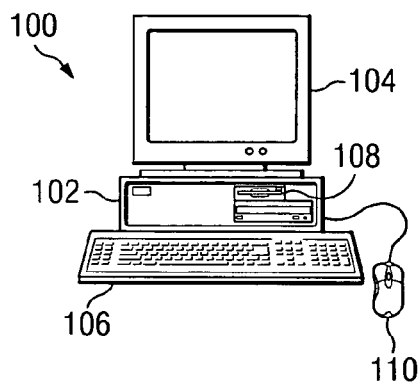
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
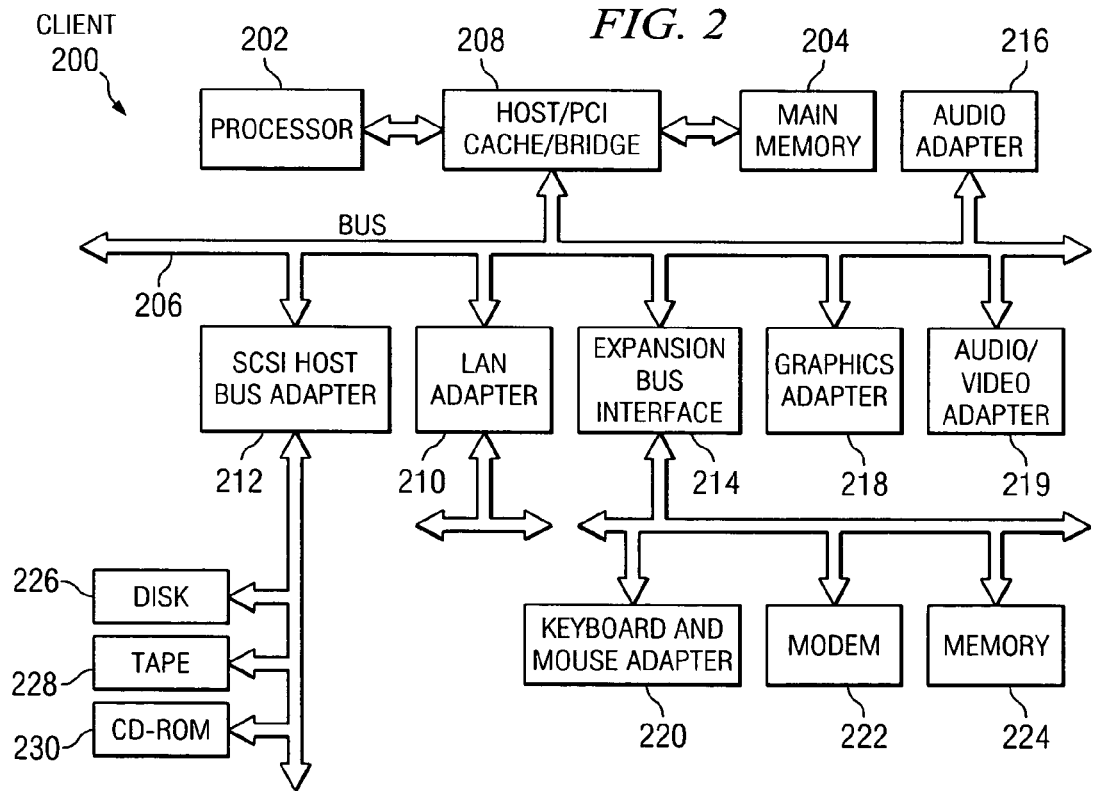
FIG. 2 is a block diagram of a data processing system that may be implemented as a server in accordance with a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
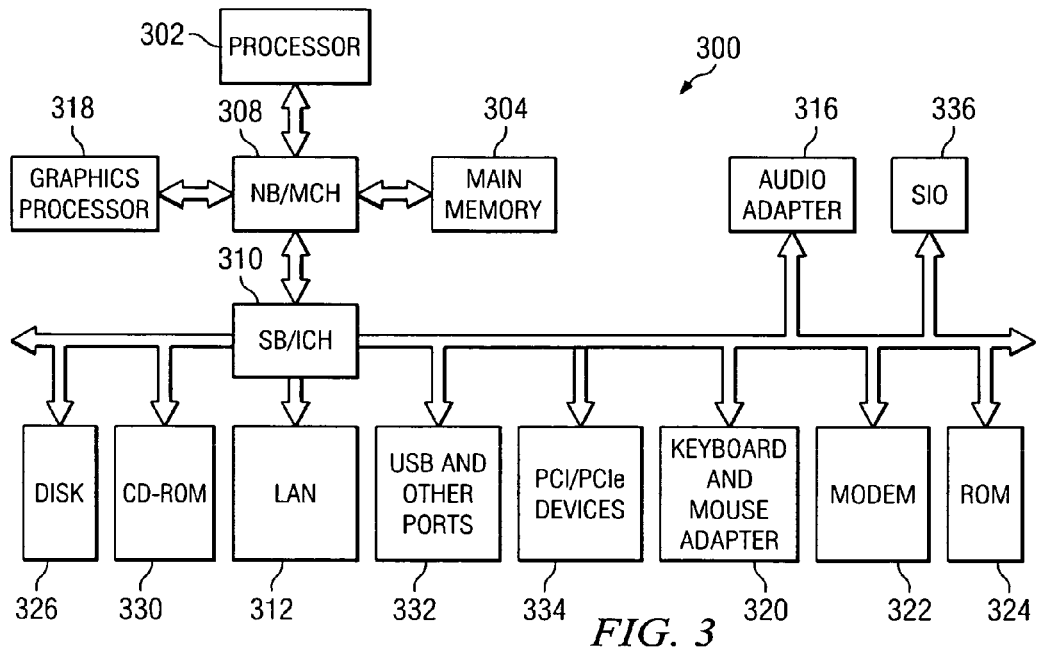
FIG. 3 is a block diagram of a data processing system in which the present invention may be implemented.

With reference now to FIG. 3, a block diagram of a data processing system is shown in which the present invention may be implemented. Data processing system 300 is an example of a computer, such as computer 100 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The present invention recognizes that the ability of a virus or worm to launch an attack is dependent on the operating system and instruction architecture. By changing either of these components, the attack methodology is compromised. Because the predominant dependency of these attacks is on the processor instruction architecture, data processing systems using non-Intel architectures are not directly susceptible to attacks launched against an Intel architecture. As preferably embodied, this present invention provides a programmable decryption unit in the instruction pipeline between the L2 and L1 instruction cache. This programmable decryption unit accomplishes the instruction decryption as architected instructions enter the L1 instruction cache.

Figure 4:
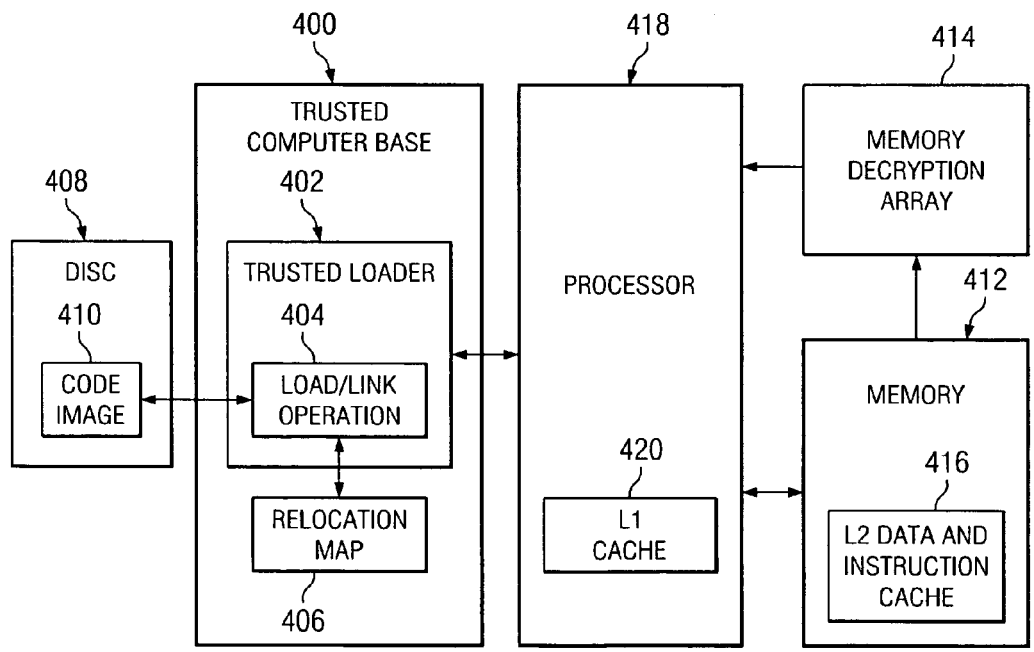
FIG. 4 is a diagram illustrating components used in the programmable decryption unit in the instruction pipeline.

With reference now to FIG. 4, a diagram illustrating components used in the programmable decryption unit in the instruction pipeline is depicted in accordance with a preferred embodiment of the present invention. As illustrated, trusted computer base 400 includes trusted loader 402, which performs load/link operations 404 on a code image 410 which is usually located on disc 408. A Trusted Computer Base (TCB) is that part of a computer system that is trusted. This part of the computer has been verified to have no malicious code or components that would impact the security of a system. Trusted computer base 400 is a portion of the data processing system that is trusted to be free of malicious code, such as, viruses or worms.

When instructions are selected for decryption, the instructions are located via relocation map 406 in trusted computer base 400. In this exemplary embodiment, the instructions are fetched from L2 data and instruction cache 416 in memory 412 and decrypted using memory decryption array 414. Memory decryption array 414 decrypts the instructions using a method that will be described in FIGS. 6 and 7. Then, the encrypted instructions are received by an instruction execution unit, such as by processor 418 or by L1 cache 420, although any instruction execution unit may receive the decrypted instruction. Any instruction stream not loaded by trusted loader 402 cannot receive the correct encoding and upon decryption will cause an illegal instruction interrupt. This protects trusted computer base 400 from any code that is loaded and executed which falls outside the security model, i.e. code loaded through exploitation of system vulnerability. Additionally this invention prevents privilege escalation, which is code that exploits a vulnerability to change privilege level.

Figure 5:
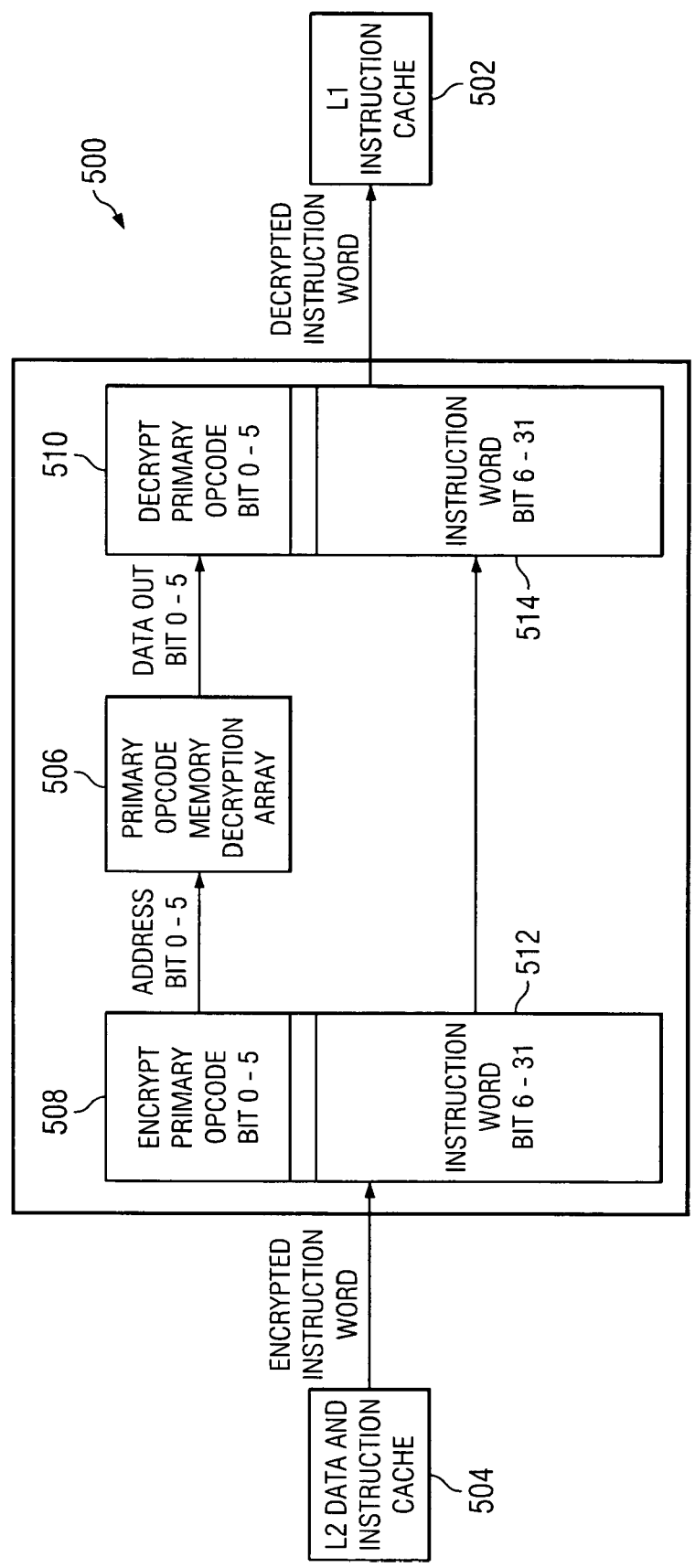
FIG. 5 is a diagram illustrating a simplified programmable decryption unit for primary opcodes is depicted in accordance with a preferred embodiment of the present invention.

With reference now to FIG. 5, a diagram illustrating a simplified programmable decryption unit 500 for primary opcodes is depicted in accordance with a preferred embodiment of the present invention. Primary memory array 506 is programmed to decrypt the instructions fetched from L2 Data and Instruction cache 504 into L1 instruction cache 502. As instructions are fetched from L2 data and instruction cache 504 into L1 instruction cache 502 the opcode bits 0-5 for the primary opcode 508 are used as the address bits 0-5 for primary memory array 506. Primary memory array 506 is configured to receive address bits 0-5, decrypt the bits and provide output data bits 0-5 to decrypted primary opcode 510. Instruction bits 6-31 512 are passed directly to instruction bits 6-31 514.

Primary memory array 506 may be part of a larger memory array. As part of a larger memory array, primary memory array 506 may operate in a hypervisor mode, a supervisor mode, or a user mode. These modes or levels allow privilege level decryption that prevents privilege escalation through exploitation of the operating system or hypervisor vulnerability. Additionally, a default mode, not shown, allows instructions to pass without decryption. Primary memory array 506 is programmed at different times and each privilege mode or level is programmable by the level(s) above. Hypervisor mode is programmed via the Serial COMmunications (SCOM) port by the Flexible i&p Series (FipS) code prior to hypervisor execution, the supervisor mode is programmed prior to the operating system executing on the processor, and the user mode is programmed from supervisor mode prior to user mode execution. Primary memory array 506 may operate in any mode. Because the instructions are decrypted prior to entering L1 instruction cache 502, the operational advantage of the instruction cache is preserved.

With reference now to FIG. 6, a diagram illustrating a primary and a secondary opcode decryption unit is depicted in accordance with a preferred embodiment of the present invention. For example, in an architecture with dense primary opcode space such as the Power™ architecture, it is necessary to use secondary opcode mapping to increase the Strength of Function (SOF) necessary to thwart more sophisticated attacks.

Primary memory array 606 and secondary memory array 608 in opcode decryption unit 600 are programmed to decrypt instructions fetched from L2 Data and Instruction cache 604 into L1 instruction cache 602. As instructions are fetched from L2 data and instruction cache 604 opcode bits 0-5 for the primary opcode 610 and opcode bits 21-30 for secondary opcode 612 are used as address bits for primary memory array 606 and secondary memory array 608. Primary memory array 606 is configured to receive address bits 0-5, decrypt the bits and provide output data bits 0-5 to decrypted primary opcode 614. Secondary memory array 608 is configured to receive address bits 21-30, decrypt the bits and provide output data bits 21-30 to decrypted secondary opcode 616. In this example, the secondary opcode 612 is only used when the primary opcode 610 equals 0x31, which is the hexadecimal representation of the opcode. The secondary opcode 612 may also be used when the secondary opcode 612 space is very sparse, less than 50 percent, and when the instructions provides a large number of permutations. Instruction bits 618 and 620 are not decrypted and are passed directly from encryption bits 618 and 620 to decryption bits 622 and 624.

FIG. 6 depicts memory arrays that have address lines, primary opcode 610 and secondary opcode 612, driven by the data presented by the L2 data and instruction cache 604, when the data is latched on these address lines, the data bus presents decrypt instructions. The presentation of these decrypt instructions is depicted as primary opcode 610 bit 0-5 being driven to primary memory array 606 and secondary opcode 612 bit 21-30 being driven into the secondary memory array 608.

In these illustrative examples, primary memory array 606 and secondary memory array 608 are arranged as three sections, hypervisor mode, supervisor mode, and user mode. This allows privilege level decryption that prevents privilege escalation through exploitation of operating system or hypervisor vulnerability. Additionally a default mode, not shown, is allowed that passes the instructions without decryption. Primary memory array 606 and secondary memory array 608 are programmed at different times and each privilege level is programmable by the level(s) above. Hypervisor mode is programmed via the SCOM port by the FipS code prior to hypervisor execution, the supervisor mode is programmed prior to the operating system executing on the processor, and the user mode is programmed from supervisor mode prior to user mode execution. Both primary memory array 606 and secondary memory array 608 may operate in any mode or in any combination of modes. Because the instructions are decrypted prior to entering L1 instruction cache 602, the operational advantage of the instruction cache is preserved.

Thus, the present invention provides a method and apparatus for an independent operating system for the prevention of certain classes of computer attacks that have previously not been preventable. An effective methodology is provided to implement instruction decryption using the existing instruction set for a processor. Significant hurdles are addressed in the processor architecture so as to limit the impact to processor execution timing. Instruction execution timing is not altered in the processor core. Any additional processing is overlapped into existing operations and, therefore, the impact on processor throughput is minimal.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for preventing attacks in a computer system, the method comprising:
   fetching an encrypted instruction stream of an executable program, wherein the encrypted instruction stream includes individually encrypted opcodes;
   decoding a field within each of the individual opcodes in conformity with a programmable look-up coding previously programmed by a system program having a privilege level higher than another privilege level of the executable program, to provide decrypted values corresponding to the individual opcodes;
   combining the decrypted values with a remaining portion of the corresponding individual opcodes exclusive of the field, to form a stream of decrypted instructions; and
   providing the decrypted instructions to a processor within the computer system for execution of the decrypted instructions.

2. The method of claim 1, wherein the decoding comprises providing the field within the individual opcodes as addresses to a memory array having values programmed by the system program as a look-up table for performing the decoding, whereby a data output of the memory array provides the decrypted values.

3. The method of claim 2, wherein the memory array is a portion of system memory within the computer system.

4. The method of claim 3, wherein the system program is a hypervisor and wherein the another privilege level is a supervisor mode privilege level.

5. The method of claim 3, wherein the system program is an operating system, wherein the privilege level of the system program is a supervisor privilege level and wherein the another privilege level is a user mode privilege level.

6. The method of claim 3, wherein the decoding comprises first decoding, wherein the field is a first field, wherein the decrypted values are first decrypted values, and wherein the method further comprises second decoding another field within the individual opcodes in conformity with a second variable decryption coding set to produce second decrypted values, and wherein the combining combines the first and the second decrypted values with another remaining portion of the instructions exclusive of the first and second fields, to form the stream of decrypted instructions.

7. The method of claim 6, further comprising determining whether the first field has a predetermined value, and wherein the second decoding is performed only if the first field has the predetermined value.

8. A computer system comprising a processor for executing program instructions stored in a memory, wherein the program instructions are program instructions for preventing attacks in the computer system, wherein the program instructions comprise program instructions for:
   fetching an encrypted instruction stream of an executable program, wherein the encrypted instruction stream includes individually encrypted opcodes;
   decoding a field within each of the individual opcodes in conformity with a programmable look-up coding previously programmed by a system program having a privilege level higher than another privilege level of the executable program, to provide decrypted values corresponding to the individual opcodes;
   combining the decrypted values with a remaining portion of the corresponding individual opcodes exclusive of the field, to form a stream of decrypted instructions; and
   providing the decrypted instructions to a processor within the computer system for execution of the decrypted instructions.

9. The computer system of claim 8, wherein the program instructions for decoding provide the field within the individual opcodes as addresses to a memory array having values programmed by the system program as a look-up table for performing the decoding, whereby a data output of the memory array provides the decrypted values.

10. The computer system of claim 9, wherein the memory array is a portion of system memory within the computer system.

11. The computer system of claim 9, wherein the system program is a hypervisor and wherein the another privilege level is a supervisor mode privilege level.

12. The computer system of claim 9, wherein the system program is an operating system, wherein the privilege level of the system program is a supervisor privilege level and wherein the another privilege level is a user mode privilege level.

13. The computer system of claim 9, wherein the decoding comprises first decoding, wherein the field is a first field, wherein the decrypted values are first decrypted values, and wherein the program instructions further comprise program instructions for second decoding another field within the individual opcodes in conformity with a second variable decryption coding set to produce second decrypted values, and wherein the program instructions for combining combine the first and the second decrypted values with another remaining portion of the instructions exclusive of the first and second fields, to form the stream of decrypted instructions.

14. The computer system of claim 13, wherein the program instructions further comprise program instructions for determining whether the first field has a predetermined value, and wherein the program instructions for second decoding are only executed if the first field has the predetermined value.

15. A computer program product comprising a non-transitory computer-readable storage media encoding program instructions for preventing attacks in the computer system, wherein the program instructions comprise program instructions for:
   fetching an encrypted instruction stream of an executable program, wherein the encrypted instruction stream includes individually encrypted opcodes;
   decoding a field within each of the individual opcodes in conformity with a programmable look-up coding previously programmed by a system program having a privilege level higher than another privilege level of the executable program, to provide decrypted values corresponding to the individual opcodes;
   combining the decrypted values with a remaining portion of the corresponding individual opcodes exclusive of the field, to form a stream of decrypted instructions; and
   providing the decrypted instructions to a processor within the computer system for execution of the decrypted instructions.

16. The computer program product of claim 15, wherein the program instructions for decoding provide the field within the individual opcodes as addresses to a memory array having values programmed by the system program as a look-up table for performing the decoding, whereby a data output of the memory array provides the decrypted values.

17. The computer program product of claim 16, wherein the memory array is a portion of system memory within the computer system.

18. The computer program product of claim 16, wherein the system program is a hypervisor and wherein the another privilege level is a supervisor mode privilege level.

19. The computer program product of claim 16, wherein the system program is an operating system, wherein the privilege level of the system program is a supervisor privilege level and wherein the another privilege level is a user mode privilege level.

20. The computer program product of claim 16, wherein the decoding comprises first decoding, wherein the field is a first field, wherein the decrypted values are first decrypted values, and wherein the program instructions further comprise program instructions for second decoding another field within the individual opcodes in conformity with a second variable decryption coding set to produce second decrypted values, and wherein the program instructions for combining combine the first and the second decrypted values with another remaining portion of the instructions exclusive of the first and second fields, to form the stream of decrypted instructions.

21. The computer program product of claim 20, wherein the program instructions further comprise program instructions for determining whether the first field has a predetermined value, and wherein the program instructions for second decoding are only executed if the first field has the predetermined value.

* * * * *